United States Patent

[11] 3,574,470

| [72] | Inventors | T. O. Paine<br>Deputy Administrator of the National Aeronautics and Space Administration in respect to an invention of;<br>Edward K. Vukelich, Flathead County, Mont.; William D. Howard, Huntsville, Ala. |
|---|---|---|
| [21] | Appl. No. | 838,630 |
| [22] | Filed | July 2, 1969 |
| [45] | Patented | Apr. 13, 1971 |

[54] METHOD AND DEVICE FOR DETECTING VOIDS IN LOW-DENSITY MATERIAL
5 Claims, 2 Drawing Figs.

[52] U.S. Cl. .................................................... 356/209, 250/219
[51] Int. Cl. ....................................................... G01n 21/48
[50] Field of Search........................................... 250/222, 223 (B), 219 (DF), 219 (S); 356/201, 209—211, 237; 73/104, 105

[56] References Cited
UNITED STATES PATENTS

| 2,939,963 | 6/1960 | Rideout......................... | 250/219 |
| 3,206,603 | 9/1965 | Mauro........................... | 250/219X |
| 3,224,324 | 12/1965 | Coppock et al............... | 356/209 |
| 3,327,849 | 6/1967 | Sorbie.......................... | 250/223X |
| 3,460,143 | 8/1969 | Vaccaro........................ | 356/209X |

Primary Examiner—Walter Stolwein
Attorneys—L. D. Wofford, Jr., Wayland H. Riggins and G. T. McCoy ABSTRACT: A method and device for detecting abnormal voids in a low-density material such as polyurethane foam insulation wherein light is beamed into the material and the light reflected from the material is received by a photodetector which converts the light into a voltage level proportional to the light intensity received by the detector. The intensity of the reflected light decreases when the light is beamed into low-density material having an abnormal void therein and the void is indicated by resultant reduction in voltage output of the photodetector.

PATENTED APR 13 1971 3,574,470

E. K. VUKELICH
W. D. HOWARD
INVENTORS

BY
ATTORNEYS

METHOD AND DEVICE FOR DETECTING VOIDS IN LOW-DENSITY MATERIAL

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to a method and means for detecting defects in low-density material and more particularly to a method and device for photoelectrically detecting abnormal voids in a low-density material such as low-density foam insulation.

Among the materials currently being used for thermal insulation purposes is low-density foam material, an example of which is polyurethane "spray-on foam insulation." One area of extensive use of low-density foam insulation is found in the fabrication of space vehicles wherein very effective and lightweight insulation is required in the insulation of tanks holding cryogenic propellants such as liquid hydrogen and liquid oxygen.

Since the effectiveness of the spray-on foam insulation is a critical matter in the manufacturing of space vehicles, improved techniques are needed for detecting voids in the insulation after it is applied. Of course, the detection method must be nondestructive to the insulation. Prior experience in nondestructive detection tests of low-density foam insulation has shown that known techniques for nondestructive testing, such as ultrasonic vibration, are not completely reliable when employed on low-density foam because the electrical and acoustical impedance of low-density foam is so close to those of air. Therefore, abnormal voids in the foam insulation are not indicated with the reliability desired when these prior testing methods are used.

SUMMARY OF THE INVENTION

The invention comprises a method and device for detecting voids in low-density foam material wherein a light beam is transmitted into the material that has been applied on a backing panel such as an aluminum wall of a propellant tank. The light reflected from the low-density foam and the backing panel is received by a high-sensitivity photovoltaic detector and is converted into a voltage level proportional to the light intensity received by the detector. A reduction in the intensity of the reflected light occurs when the light is beamed into foam having voids therein large enough to constitute significant defects in the insulation effectiveness of the foam. The device of the invention comprises a housing unit containing a light source, a light detector and a voltage amplifier. The light is transmitted into the material being tested through a port in the housing and the reflected light is received by the detector in a second port in the housing. The housing unit may be mounted on an automatic scanning system including a recorder for providing a C-scan recording depicting the internal structure of the foam insulation being tested for voids.

Accordingly, it is a general object of the present invention to provide an improved method and device for detecting defects in low-density foam material.

Another object of the invention is to provide a relatively simple, economical and more reliable means for detecting voids in polyurethane spray-on foam insulation.

Another object of the invention is to provide a means for detecting voids in low-density foam material that will provide a recording depicting the internal structure of the foam material and which means overcomes the prior difficulties of detecting voids in low-density foam material caused by the similarity of the electrical and acoustical impedance of low-density foam and that of air.

These and other objects of the invention will become apparent upon reference to the following specification, attendant claims and drawing.

DESCRIPTION OF THE PREFERRED EMBODIMENT

Figure 1:
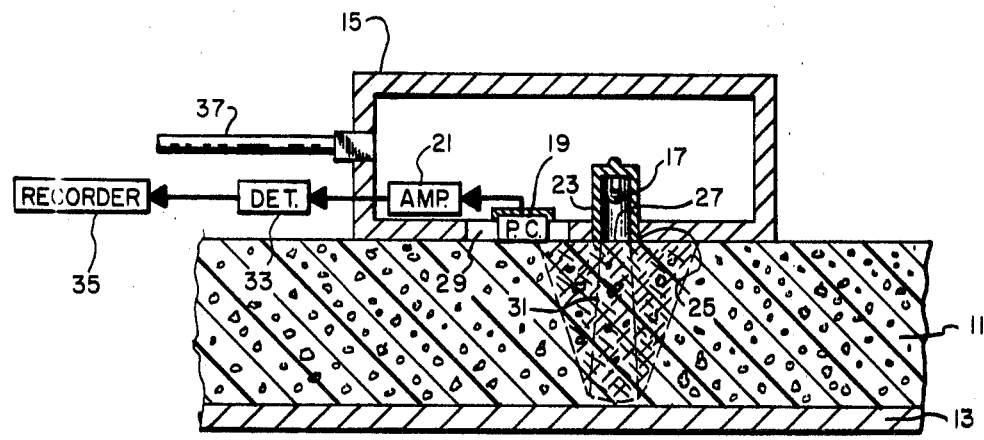
FIG. 1 is a cross-sectional view of the void detection device overlying foam insulation applied to a backing panel with the circuitry shown in block diagram.

Referring to FIG. 1, therein is shown a layer of low-density foam insulation 11 applied to a backing 13 which may be an aluminum wall section of a container such as a propellant tank. The foam 11 would typically be polyurethane spray-on foam insulation of low density.

The device for testing or inspecting the foam 11 for void defects within the foam material comprises a housing unit 15 containing a light source 17, a light detector 19 and an amplifier 21. The light source 17 may comprise an incandescent lamp and in one embodiment a General Electric No. 47 lamp was used. The light source 17 is mounted in a compartment 23 that is fitted in an opening 25 in the housing unit 15. The compartment has a port 27 through which the light is directed into the foam 11.

The light detector 19 receives light reflected from the foam material 11 and converts the reflected light into a voltage level proportional to the light intensity received by the light detector. One embodiment of the invention comprised a 602 photovoltaic detector marketed by the Electro-Nuclear Laboratories, Inc. The light detector 19 is movably mounted in an elongated slot 29 in the housing unit 15. The slot 29 permits adjustment of the separation between the light source 17 and the light detector 19.

A light beam 31 is transmitted into the foam material 11 from the light source 17. The beam 31 is diffused within the foam material and some of the light is reflected from the material. When the foam is substantially uniform in density, texture and color the light is diffused evenly within the material and the intensity of the reflected light received by the detector 19 remains essentially constant. It has been found, however, that the intensity of the reflected light received by the detector 19 decreases when the foam material under inspection has a void therein of a size that would seriously impair the insulation effectiveness of the material.

The amplifier 21 receives the voltage signal from the light detector 19 and amplifies the voltage and applies the amplified voltage to a threshold detector 33, the latter being connected to a recorder 35. In previous operational embodiments the intensity of the light from the source 17 and the amplifier gain were adjusted so that the threshold detector passed a voltage of −15 volts to the recorder when the light was beamed into sound foam and 0 volts when the light was beamed into a defective area containing a void.

Figure 2:
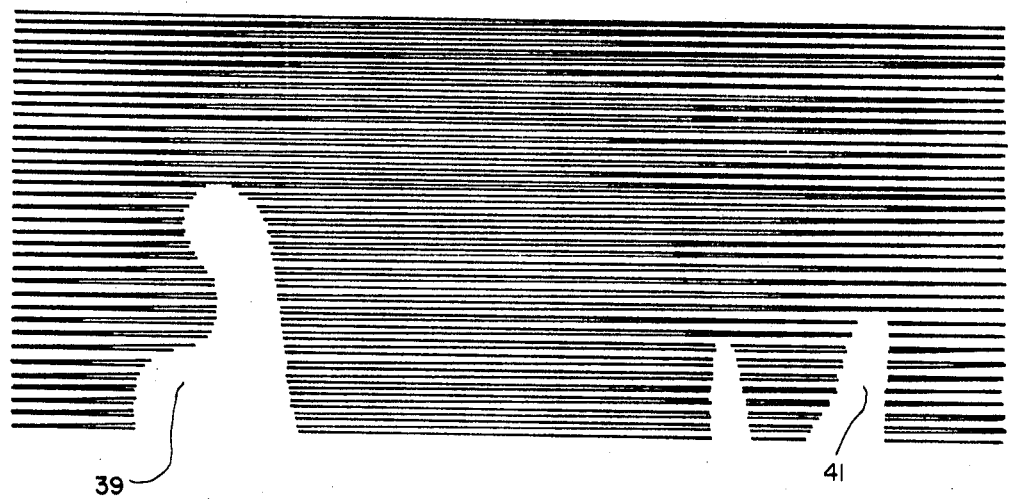
FIG. 2 is a view indicating the type of recording produced by the void detector and indicating voids present in a low-density foam material.

The housing unit 15 may be mounted on a moveable arm 37 of an automatic scanning system and systematically scanned across the foam panel to produce a C-scan recording depicting the internal structure of the foam insulation. A portion of such a recording is shown in FIG. 2. Voids in the material are indicated by the blank areas such as 39 and 41.

We claim:

1. The method of detecting abnormal voids in a low-density, spray-on foam material having an opaque backing on one surface thereof comprising:
   a. positioning a light source and a photodetector adjacent the surface of said material opposite said opaque backing so that said light source and said photodetector are protected from external light;
   b. transmitting a beam of light directly from said light source into said material whereby said light is diffused within said material and some of said light is reflected from said material; and c. detecting with means including said photodetector significant variations in the intensity of light reflected from said material and thereby detecting abnormal voids in said material.

2. The method of claim 1 including scanning a predetermined area of said low-density material by moving said light source and said photodetector over said material while continuously transmitting a beam of light directly from said light source into said material and continuously detecting significant variations in the intensity of light reflected from said material.

3. The method of claim 2 including producing a recording indicating abnormal voids in said material and delineating the location of such voids.

4. The method of claim 1 wherein said low-density material is polyurethane foam material and said opaque backing is metal.

5. A device for detecting abnormal voids in a low-density, spray-on foam material comprising:

a. a housing containing a light source and a photodetector;

b. said housing having a flat exterior surface adapted to contact and move over the surface of the material being inspected;

c. a plurality of spaced openings in said housing extending from the interior of said housing to said exterior surface;

d. said light source being mounted in alignment with one of said openings and said photodetector being mounted in alignment with another of said openings;

e. said light source and said photodetector being directed outwardly of said exterior surface whereby said light source is adapted to transmit light into said material and the said photodetector is adapted to receive light reflected from said material;

f. means for adjusting the spacing between said light source and said photodetector;

g. means for amplifying a signal from said photodetector;

h. a recorder associated with said amplifier;

i. means including said amplifying means for applying a predetermined voltage to said recorder when said light source is transmitting light into sound material and applying a zero voltage to said recorder when said light source is transmitting light into a material having an abnormal void therein; and j. an arm attached to said housing for moving said housing in a scanning motion over the surface of the material being inspected.